United States Patent
Kazama

[11] Patent Number: 6,028,742
[45] Date of Patent: Feb. 22, 2000

[54] SUPPORTING STRUCTURE OF A MAGNETIC HEAD DEVICE HAVING A HOLE CONFIGURATION PROVIDED ON THE RESILIENTLY DEFORMABLE PORTION

[75] Inventor: Toshio Kazama, Niigata-ken, Japan

[73] Assignee: Alps Electric Col., Ltd., Tokyo, Japan

[21] Appl. No.: 09/090,580

[22] Filed: Jun. 4, 1998

[30] Foreign Application Priority Data

Jun. 5, 1997 [JP] Japan ................................ 9-148245

[51] Int. Cl.[7] .................................................. G11B 5/48
[52] U.S. Cl. ....................................................... 360/104
[58] Field of Search ............................................ 360/104

[56] References Cited

U.S. PATENT DOCUMENTS

| | | | |
|---|---|---|---|
| 4,167,765 | 9/1979 | Watrous | 360/104 |
| 4,208,684 | 6/1980 | Janssen et al. | 360/104 |
| 4,734,805 | 3/1988 | Yamada et al. | 360/104 |
| 5,126,904 | 6/1992 | Sakurai | 360/104 |
| 5,313,353 | 5/1994 | Kohso et al. | 360/104 |
| 5,734,525 | 3/1998 | Girard | 360/104 |
| 5,757,586 | 5/1998 | Budde | 360/104 |
| 5,812,344 | 9/1998 | Balakrishnan | 360/104 |
| 5,870,252 | 2/1999 | Hanrahan | 360/104 |
| 5,894,381 | 4/1999 | Allen et al. | 360/104 |
| 5,901,016 | 5/1999 | Iwamoto | 360/104 |

*Primary Examiner*—Brian E. Miller
*Attorney, Agent, or Firm*—Brinks Hofer Gilson & Lione

[57] ABSTRACT

A supporting structure of a magnetic head device in which small holes of the same size are formed so as to be distributed in a resiliently deformable portion in order to reduce the spring constant thereof and make the resiliently deformable portion less susceptible to torsional resonance. In particular, when the holes are formed at equal intervals in a direction parallel to diagonals drawn across the resiliently deformable portion so that the holes are not formed on the diagonals, a structure less susceptible to torsional resonance can be provided.

3 Claims, 3 Drawing Sheets

FIG. 5
PRIOR ART
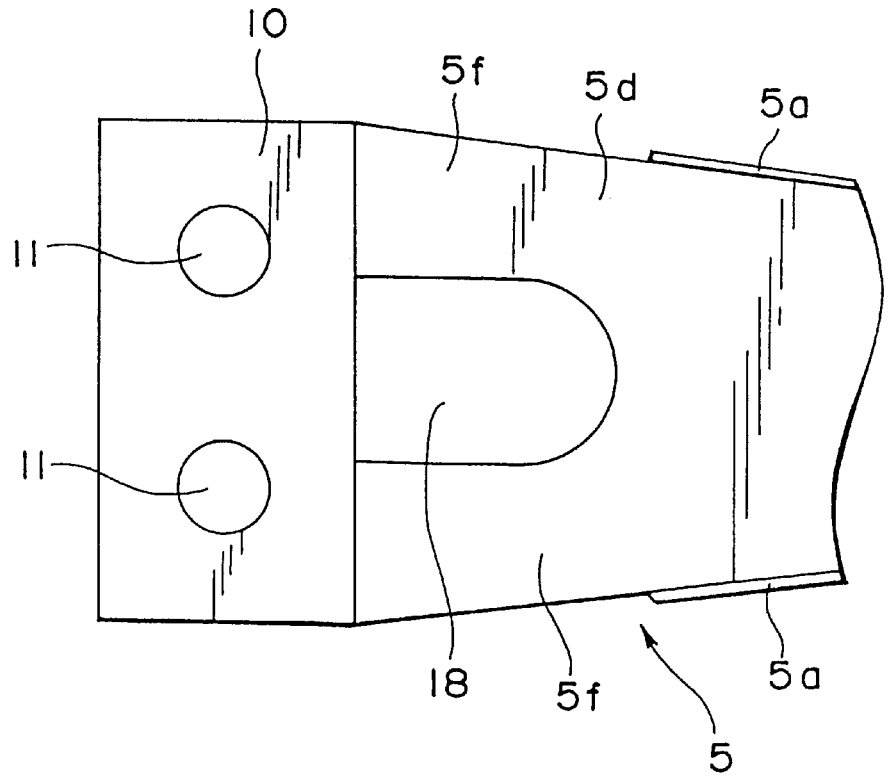
FIG. 6
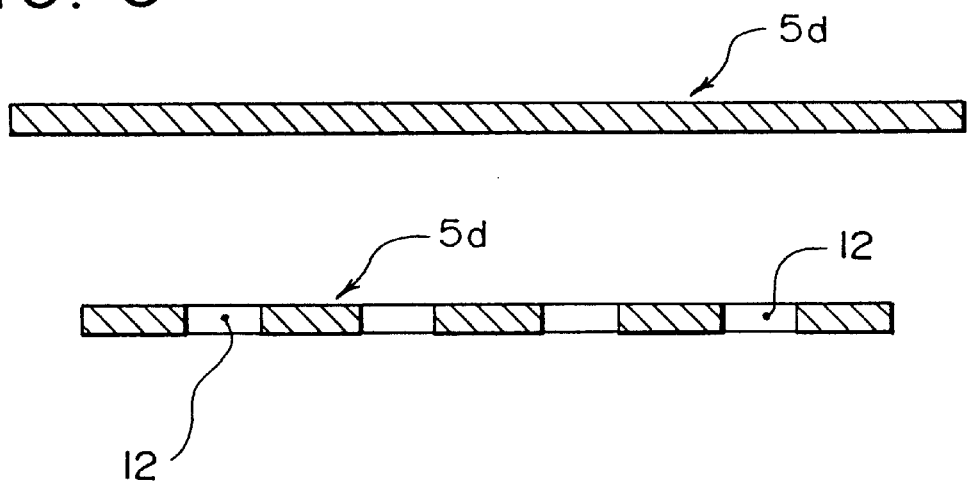
FIG. 7

SUPPORTING STRUCTURE OF A MAGNETIC HEAD DEVICE HAVING A HOLE CONFIGURATION PROVIDED ON THE RESILIENTLY DEFORMABLE PORTION

BACKGROUND OF THE INVENTION

1. Field of the Invention

The present invention relates to a supporting structure of a floating magnetic head device installed in, for example, a hard disk drive or an optical disk drive, and, more particularly, to a supporting structure of a magnetic head device in which torsional resonance does not occur easily, even when the spring constant of a load beam which rockably supports a head body is reduced.

2. Description of the Related Art

FIG. 4 is a plan view of a conventional magnetic head device for use in a hard disk drive.

The magnetic head device comprises a head body 1 and a supporting member 2 which supports the head body 1.

The head body 1 includes a slider 3 opposing a recording medium, such as a hard disk, with a thin film magnetic element (not shown) being provided at a trailing side end surface of the slider 3. The slider 3 is made of, for example, a ceramic material. The thin film magnetic element comprises a MR head (read head) and an inductive head (write head). The MR head detects any magnetic field leakage from a recording medium, such as a hard disk, by making use of the magneto-resistive effect in order to read a magnetic signal. The inductive head includes, for example, a coil formed into a pattern.

The supporting member 2 comprises a load beam 5 and a flexure 6.

The load beam is composed of a plate spring. As shown in FIG. 4, bent portions 5a are formed on both sides of one end of the load beam 5 so as to extend a certain distance from the one end. The portion of the load beam 5 extending from the starting side and terminating side of the bent portions 5a is the highly rigid portion 5b. A spherical pivot 17 is formed near one end of a flat portion 5c, formed between the bent portions 5a, so as to extend downward, in FIG. 4. In addition, a positioning hole 8 used for adjusting the position of a flexure (described later) is formed in the flat portion 5c.

The load beam 5 includes a resiliently deformable section 5d formed from the rear end portion of the flat portion 5c and integrally therewith. A mount member 10 is mounted onto the stem end of the load beam 5, and has fixing holes 11 used for fixing the load beam 5 to, for example, an actuating arm.

The flexure 6 is composed of a thin plate spring, and comprises a fixing portion 6a and a cantilever 6b. As shown in FIG. 4, a positioning hole 9 is formed in the fixing portion 6a. After aligning the positioning hole 9 and the positioning hole 8 in the load beam 5 relative to each other, the fixing portion 6a is affixed to the bottom surface of the load beam 5 by, for example, spot welding. The cantilever 6b corresponds to the portion separated by a slot formed in one end of the flexure 6. The top surface of the cantilever 6b is abutted against the pivot 17 of the load beam 5. The resiliency of the cantilever 6b allows the head body 1, bonded to the bottom surface of the cantilever 6b, to freely change its posture on a bottommost point B, as a fulcrum, of the pivot 17.

When a recording medium, such as a hard disk or a magneto-optical disk, is stationary, the load beam 5 exerts a resilient pressing force on the head body 1 of the magnetic head device, causing it to be biased towards the recording medium. When the recording medium starts rotating, air current flows between the head body 1 and the recording medium, and produces a floating force, which is exerted to the bottom surface of the head body 1, causing it to float above the recording medium. In the floated state, the thin film magnetic element, provided at the slider 3 of the head body 1, either records a magnetic signal on the recording medium or reads the magnetic signal recorded on the recording medium.

In recent years, however, the sliders 3 are becoming smaller (or lighter). Therefore, in order to make the slider 3 float properly, while it is sliding along a recording medium, it is necessary to reduce the amount of pressing force that the load beam 5 exerts onto the slider 3.

In order to reduce the pressing force, the spring constant of the load beam 5 must be reduced. Conventionally, the spring constant was made smaller, for example, by making the load beam thinner, or by reducing the cross sectional area of the resiliently deformable section 5d of the load beam 5 in a widthwise direction thereof.

However, making the load beam 5 thinner causes the load a beam 5 as a whole to become less rigid, so that, for example, during a seeking operation, the load beam 5 gets deflected in the seeking direction, resulting in, for example, less accurate detection of a track position. This causes tracking to be performed less accurately.

The structure shown in FIG. 5 is the most conventionally used structure for reducing the cross sectional area of the resiliently deformable section 5d of the load beam 5 in the widthwise direction thereof. This type of load beam is disclosed, for example, in Japanese Examined Patent Publication No. 8-23976.

FIG. 5 is an enlarged partial plan view of the structure of the portion around the resiliently deformable section 5d of the load beam 5.

As shown in FIG. 5, a large slot 18 is formed in the center of the resiliently deformable section 5d, whereby two legs 5f are formed on the resiliently deformable section 5d.

In such a structure, however, the legs 5f of the resiliently deformable section 5d easily resonate in a twisting direction, so that, for example, during a seeking operation, the load beam 5 gets deflected with respect to the twisting direction, making the floating posture of the head body 1 unstable. This, for example, causes tracking to be performed less accurately, just as in the case where the load beam 5 is made thinner.

SUMMARY OF THE INVENTION

Accordingly, it is an object of the present invention to provide a supporting structure of a magnetic head device, in which a load beam rockably supporting a head body has a smaller spring constant and remains highly rigid in a twisting direction, the head body can be made smaller (thinner), and torsional resonance does not occur easily.

To this end, according to a basic form of the present invention, there is provided a structure for supporting a magnetic head device comprising a load beam for supporting a head body at one end thereof, the load beam having a highly rigid portion extending a predetermined distance from one end of the load beam where the head body is supported, a fixing portion at the stem end of the load beam for fixing the load beam, and a resiliently deformable portion formed between the rigid portion and the fixing portion and having a plurality of holes formed and arranged therein, wherein when the recording medium starts moving, air currents produce a floating force which is exerted to the head body, causing the head body to either float or assume a floating posture in which the head body contacts the recording medium.

In a form of the present invention, it is preferable that the holes not be formed in locations of the resiliently deformable portion corresponding to where a diagonal is drawn obliquely across the resiliently deformable portion. In another form of the present invention, it is preferable that the plurality of holes have about the same opening areas, and be disposed at equal intervals in a direction parallel to the diagonal drawn obliquely across the resiliently deformable portion.

In still another form of the present invention, when the resiliently deformable portion is viewed cross sectionally in a widthwise direction thereof, a region of a portion without the holes having a largest cross sectional area sum and a region of the portion without the holes having a smallest cross sectional area sum may have a cross sectional area sum ratio of not more than two to one.

In still another form of the present invention, the holes may be formed in the resiliently deformable portion by etching.

According to the present invention, it is preferable that the holes be formed in the resiliently deformable section at the locations shown in FIG. 2.

The holes 12 of FIG. 2 are formed so that they satisfy both of the following conditions (A) and (B):

(A) The holes 12 are not formed in locations of the resiliently deformable section corresponding to where diagonals 13 and 14 are drawn.

(B) The holes 12 are formed in locations of the resiliently deformable section parallel to the locations corresponding to where the diagonals are drawn, and at equal intervals.

The locations of the resiliently deformable section corresponding to where the diagonals are drawn are most susceptible to twisting. Therefore, when condition (A) is satisfied, the cross sectional areas in the directions of the diagonals can be kept large, making the resiliently deformable section less susceptible to torsional resonance.

When condition (B) is satisfied, the cross sectional areas of the different locations of the entire resiliently deformable section in the widthwise direction thereof can be reduced to about the same equal value. In other words, the resiliently deformable section does not have locations with extremely small spring constants in the widthwise direction thereof, making the resiliently deformable section less susceptible to torsional resonance, as was the case when condition (A) was satisfied.

It is to be noted that in the present invention the holes may be formed in locations other than the locations in which they are formed in FIG. 2. When the plurality of holes are formed away from the locations of the resiliently deformable section corresponding to where the diagonals are drawn, to the extent possible, such that, the resiliently deformable section has a maximum cross sectional area which is not more than twice a minimum cross sectional area, the spring constants of the different locations of the resiliently deformable portion can be uniformly reduced, and the resiliently deformable portion can be kept highly rigid in the twisting direction thereof.

In the present invention, it is preferable that the holes be formed in the resiliently deformable section by etching.

As can be understood from the foregoing description, according to the present invention, small holes of about the same size are formed so as to be distributed in the resiliently deformable section of the load beam. Therefore, the spring constant of the load beam can be reduced, and there are no locations of the load beam having extremely small cross sectional areas in the widthwise direction, making the load beam less susceptible to torsional resonance.

In particular, according to the present invention, when the holes are formed in locations parallel to the locations corresponding to where the diagonals are drawn and at equal intervals, instead of in the locations of the resiliently deformable section corresponding to where the diagonals are drawn, a structure which is more highly resistant to torsional resonance can be produced, so that, for example, during a seeking operation, the load beam does not resonate in the twisting direction, allowing proper tracking to be performed.

BRIEF DESCRIPTION OF THE DRAWINGS

FIG. 5 is a partial enlarged plan view of a form of a surface of the resiliently deformable section of the conventional load beam.

FIG. 6 is a sectional view taken along line L—L of FIG. 2.

FIG. 7 is a sectional view taken along line S—S of FIG. 2.

DESCRIPTION OF THE PREFERRED EMBODIMENT

Figure 1:
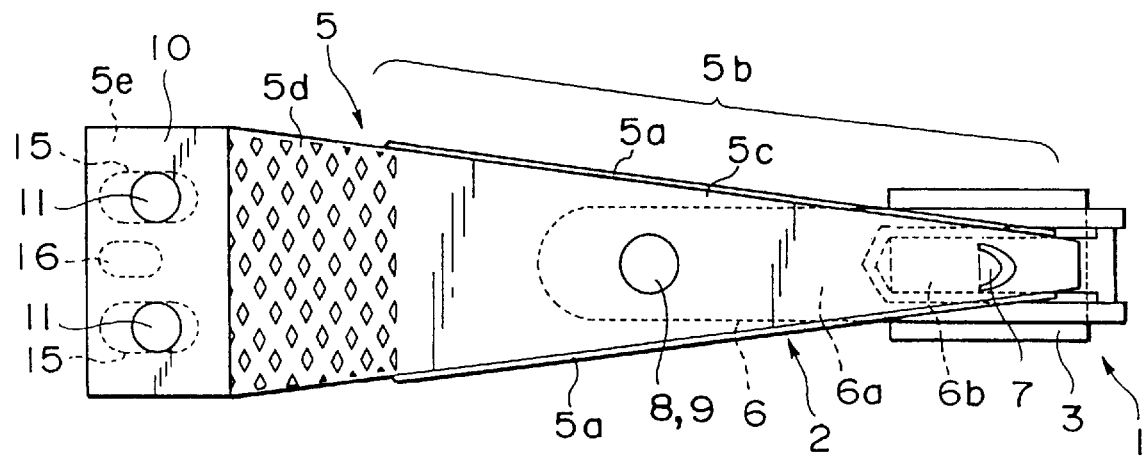
FIG. 1 is a plan view of a magnetic head device installed in a hard disk drive, in an embodiment of the present invention.
Figure 2:
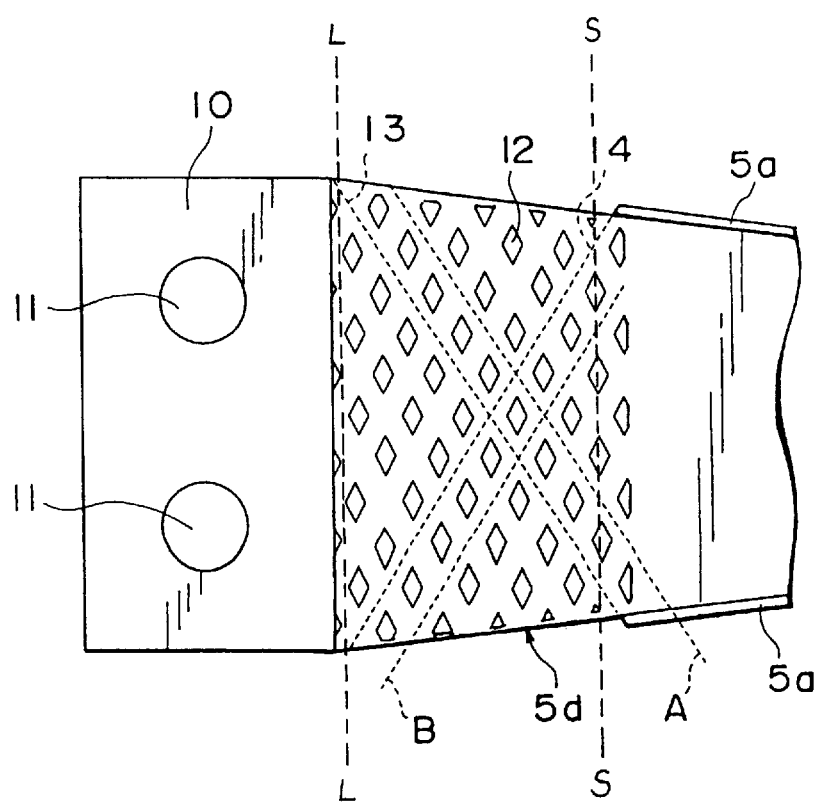
FIG. 2 is a partial enlarged plan view of the form of a surface of the resiliently deformable section of the load beam of FIG. 1.
Figure 3:
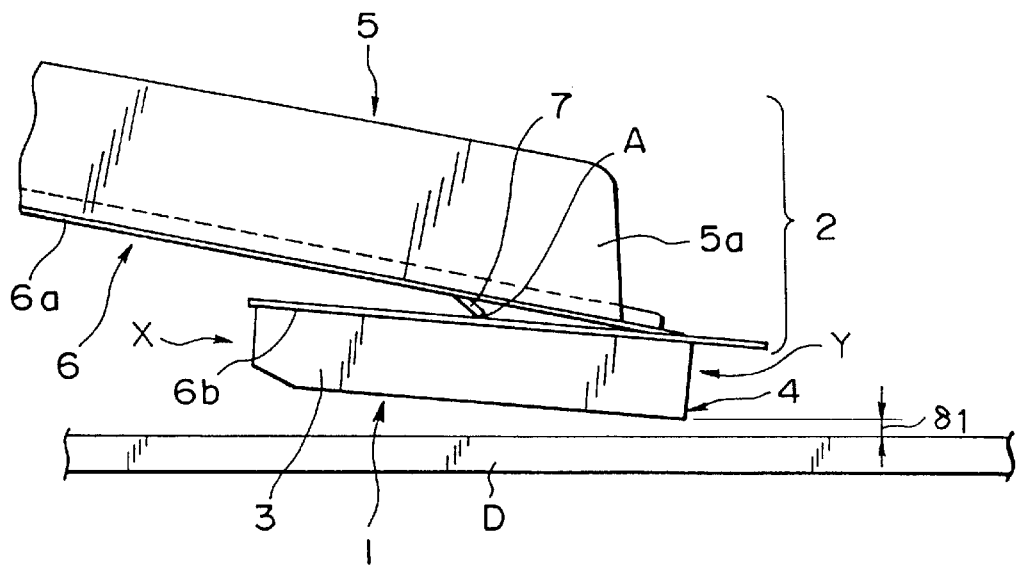
FIG. 3 is a partial side view of the magnetic head device of FIG. 1.

FIG. 1 is a plan view of a floating magnetic head device installed in, for example, a hard disk drive, in an embodiment of the present invention. FIG. 2 is a partial enlarged plan view of the portion around the resiliently deformable section of the load beam of FIG. 1. FIG. 3 is a partial side view of the magnetic head device of FIG. 1.

The magnetic head device comprises a head body 1 and a supporting member 2 which supports the head body 1.

The head body 1 includes a slider 3 and a thin film magnetic element 4 provided at a trailing side Y end surface of the slider 3 (see FIG. 3). The slider 3 is made of a ceramic material.

The aforementioned thin film magnetic element 4 is a layered structure of, for example, a magnetic material, such as permalloy (Ni—Fe type alloy), and an insulating material, such as alumina. The thin film magnetic element 4 includes a magnetic detecting section for reproducing a magnetically recorded signal on a disk, and/or a magnetic recording section for recording a magnetic signal on a disk. The magnetic detecting section is, for example, a magneto-resistance (MR) head composed of a magneto-resistance (MR) element. The magnetic recording section is an inductive head with a coil and a core, formed into a pattern.

The supporting member 2 comprises a load beam 5 and a flexure 6.

The load beam 5 is composed of a plate spring. Bent portions 5a are formed on both sides of the load beam 5 so as to extend from one end portion to a predetermined distance. The portion extending from the starting side to the terminal side of the bent portions 5a forms a highly rigid portion 5b. A pivot 7 is formed near one end of a flat portion 5c formed between the bent portions 5a.

The pivot 7 is formed by forming a slot in the flat portion 5c to separate a portion of the flat portion 5c, and bending the separated portion.

As shown in FIG. 3, a bottommost point A of the pivot 7 contacts the top surface of a cantilever 6b of the flexure 6 to be described later. The head body 1, affixed to the bottom surface of the cantilever 6b, is rockably supported at the bottommost point A, as a fulcrum, of the pivot 7.

Since the pivot 7 is formed by forming a slot, the following effects are produced.

Figure 4:
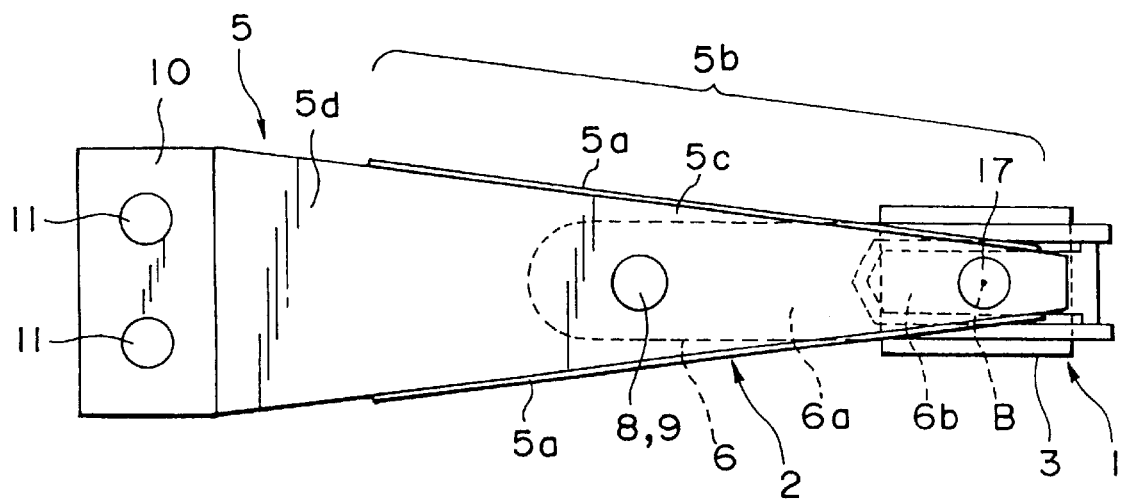
FIG. 4 is a plan view of a conventional magnetic head device.

First, since the pivot 7 is formed integrally with the load beam 5 into a flat shape, the bottommost portion A of the pivot 7 resembles a point more closely than the bottommost portion B of the pivot 17 of FIG. 4. Therefore, the head body 1 can rock more freely on the bottommost point A of the pivot 7, as fulcrum.

When the pivot 7 is being formed, the slot may be formed by etching, thereby making it easier to form the pivot 7, and allowing it to be formed more precisely at the proper location.

As shown in FIG. 1, a positioning hole 8, with which the flexure 6 is aligned, is formed in the flat portion 5c of the load beam 5.

The load beam 5 includes a resiliently deformable section 5d formed from the rear end portion of the flat portion 5c and integrally therewith. The resiliently deformable section 5d, which does not have bent portions 5a, is springy. The resilient force produced by the resiliently deformable section 5d allows the head body 1, while it is sliding along a recording medium, to follow the hills and valleys of the recording medium.

In the present invention, the form of one surface of the resiliently deformable section 5d of the load beam 5 is shown in FIG. 2.

FIG. 2 is a partial enlarged plan view of the portion around the resiliently deformable section 5d of the load beam 5 of FIG. 1.

Small rhombus-shaped holes 12 of about the same size are distributed uniformly in the resiliently deformable section 5d, as shown in FIG. 2. Formation of these holes reduces the cross sectional area of the resiliently deformable section 5d in a widthwise direction thereof, as well as its spring constant. In particular, the small holes 12 are distributed throughout the entire resiliently deformable section 5d, so that there are no locations with extremely small cross sectional areas in the widthwise direction thereof; in other words, the cross sectional areas of the different locations of the resiliently deformable section 5d can be made uniform over the entire resiliently deformable section 5d in the widthwise direction thereof. For this reason, torsional resonance does not occur easily, compared to the case where, shown in FIG. 5, only the center portion of the load beam 5 is cut out.

In the present invention, the following two conditions which must be satisfied to produce a structure capable of withstanding torsional resonance are satisfied.

The first condition satisfied is that the holes 12 are not formed in locations of the resiliently deformable section 5d corresponding to where diagonals 13 and 14 are drawn. The holes 12 are not formed in the locations corresponding to where the diagonals 13 and 14 are drawn because the locations corresponding to where the diagonals 13 and 14 are drawn are most liable to twisting. In order to make the locations corresponding to where the diagonals are drawn less liable to twisting, it is necessary to make these locations more rigid, which is achieved by increasing the cross sectional areas of these locations. Therefore, it is preferable that the holes 12 are not formed on the diagonals 13 and 14. As shown in FIG. 2, each of the holes 12 is formed into a rhombus shape, with opposite sides of each of the rhombus-shaped holes being formed parallel to the diagonals 13 and 14, respectively. The holes 12 are not formed on, for example, line A and line B parallel to the diagonal 13 and the diagonal 14, respectively. Accordingly, when the holes 12 are not formed on the slanted lines A and B, the torsional rigidity can be increased.

The second condition satisfied is that the holes 12 are formed at locations parallel to the locations corresponding to where the diagonals 13 and 14 are drawn, and at equal intervals.

When the holes 12 are formed in the resiliently deformable section 5d into the pattern of a mesh, as shown in FIG. 2, the cross sectional area of the resiliently deformable section 5d in the widthwise direction thereof becomes small and almost uniform throughout the entire resiliently deformable section 5d. The cross sectional area of the resiliently deformable section 5d also becomes virtually uniform in a lengthwise direction thereof throughout the entire resiliently deformable section 5d.

Accordingly, since the cross sectional areas of the different locations of the resiliently deformable section 5d can be made uniformly small over the entire resiliently deformable section 5d in the widthwise direction, there are no locations of the resiliently deformable section 5d having extremely small spring constants, thereby making the resiliently deformable section 5d less susceptible to torsional resonance.

According to the present invention, the locations in which the holes may be formed are not limited to the locations in which the holes are formed in FIG. 2.

However, in order to form a structure which is to a certain extent resistant to torsional resonance, the following must be considered when determining the locations of the holes. That is, the cross sectional area of the resiliently deformable section 5d in a widthwise direction thereof must be such that a region of a portion without the holes has a relatively large cross sectional area sum, as is illustrated in FIG. 6, which is a section view taken along lines L—L of FIG. 2. A region of a portion without the holes having a large cross sectional area sum is represented by the area marked by slanted lines shown in FIG. 6. A region of the portion with the holes having a relatively small cross sectional area sum is illustrated in FIG. 7, which is a sectional view taken along line S—S of FIG. 2. A region of the portion with the holes having a smaller cross sectional area sum is represented by the area marked by slanted lines shown in FIG. 7. The ratio of the large cross sectional area sum to the small cross sectional area sum being within two to one. In this case, to the extent possible, it is preferable to avoid forming the holes 12 in the locations of the resiliently deformable section 5d corresponding to where the diagonals 13 and 14 are drawn.

In the present invention, it is preferable that the holes 12 be formed by etching. The entire structure of the load beam 5 is formed by etching a flat plate. Thus, when the holes 12 are formed by etching, the etching can be performed in the same etching step performed to form the entire structure of the load beam 5, thereby reducing production costs.

As shown in FIG. 1, the fixing portion 5e is formed in the rear end portion of the resiliently deformable section so as to be integral therewith. The fixing portion 5e has fixing holes 15 and positioning hole 16 formed therein. The mount member 10 is very precisely positioned with reference to the fixing holes 15 and the positioning hole 16, and is then welded.

The load beam 5 is mounted to an actuator arm through the fixing holes 11 formed in the mount member 10, so that the fixing portion 5e of the load beam 5 is secured to and supported by the mount member 10.

The flexure 6 is composed of a thin plate spring. The fixing portion 6a of the flexure 6 has a positioning hole 9 with the same inner diameter as the positioning hole 8 formed in the load beam 5. As shown in FIG. 1, a slot is formed near the tip of the flexure 6, and separates a portion, which forms the cantilever 6b.

The head body 1, which has been positioned with reference to the bottommost point A of the pivot 7 formed integrally with the load beam 5, is bonded to the bottom surface of the cantilever 6b, as shown in FIG. 3.

The above-described magnetic head device illustrated in FIG. 1 is used in a CSS type hard disk drive (magnetic recording/reproducing apparatus). When disk D is stationary, the resiliently deformable section 5d of the load beam 5 exerts a resilient force on the head body 1, causing it to be resiliently pressed against and contact the top surface of the disk D, being a recording medium. When the disk D starts rotating, air currents flow between the head body 1 and the disk D, and, as shown in FIG. 3, cause the entire head body 1 to float a short distance δ1 above the surface of the disk D, so that the head body 1 assumes either a floating posture in which a leading side X is lifted higher than a trailing side Y from the disk, or a floating posture in which only the leading side X floats above the disk and its trailing side Y continuously or discontinuously contacts and slides along the disk.

In the present invention, as shown in FIG. 2, the small holes 12 are distributed in the resiliently deformable section 5d of the load beam 5, making it possible to reduce the spring constant of the load beam 5. Therefore, when the disk D is stationary, less pressing force is exerted onto the head body 1 by the load beam 5, allowing even a small head body 1 to float properly.

A structure which is highly resistant to torsional resonance can be formed by making the cross sectional areas of the different locations of the resiliently deformable section 5d uniform in the widthwise direction thereof as a result of forming the holes 12 in the locations shown in FIG. 2. The holes 12 are not formed in the locations of the resiliently deformable section 5d corresponding to where the diagonals 13 and 14 are drawn, or the locations most susceptible to twisting. Instead, they are formed at locations parallel to the diagonals 13 and 14 drawn across the resiliently deformable section 5d and at equal intervals.

Therefore, when, for example, the head body 1 is executing a seeking operation or is sliding along a disk, the load beam 5 is not deflected in the twisting direction, allowing the head body 1 to assume a stable floating posture and perform proper tracking operations.

As can be understood from the foregoing description, a description was made of a supporting structure of a magnetic head device in a hard disk drive, but the structure of the present invention can also be applied to a load beam of a magneto-optical head device for recording and reproducing data, which has a head body which floats high above a recording medium.

As can be understood from the foregoing description, according to the supporting structure of the magnetic head device of the present invention, small holes of about the same size are formed so as to be distributed in the resiliently deformable section of the load beam rockably supporting the head body. Therefore, the spring constant of the load beam can be reduced to minimize the occurrence of torsional resonance to the extent possible.

In particular, according to the present invention, the holes are not formed in the locations of the resiliently deformable section corresponding to where the diagonals are drawn, or the locations most susceptible to twisting. Instead, they are formed at locations parallel to the locations where the diagonals are drawn and at equal intervals, so that the cross sectional area of the resiliently deformable section in the widthwise direction thereof is substantially uniform, thereby making the supporting structure more resistant to torsional resonance.

Accordingly, in the present invention, the spring constant of the load beam can be reduced, so that a load beam which is highly resistant to torsional resonance can be produced even for a smaller head body. Therefore, for example, when the head body is performing a seeking operation or sliding along a recording medium, the load beam does not get twisted, allowing the head body to assume a stable floating posture and perform proper tracking operations.

What is claimed is:

1. A structure for supporting a magnetic head device, comprising:

a load beam for supporting a head body at one end thereof, said load beam having a highly rigid portion extending a predetermined distance from one end of said load beam where the head body is supported, a fixing portion at the stem end of said load beam for fixing said load beam, and a resiliently deformable portion formed between said rigid portion and said fixing portion and having a plurality of holes formed and arranged therein, said plurality of holes are not formed in locations of said resiliently deformable portion corresponding to where a diagonal is drawn obliquely across said resiliently deformable portion, and said plurality of holes have about the same opening areas and are disposed at equal intervals in a direction parallel to said diagonal, such that when said resiliently deformable portion is viewed cross sectionally in a widthwise direction thereof, a region of a portion without said holes has a larger cross sectional area sum and a region of the portion with said holes has a smaller cross sectional area sum wherein the cross sectional area sum ratio between the larger cross sectional area sum and smaller cross sectional area sum is not more than two to one, wherein when the recording medium starts moving, air currents produce a floating force which is exerted to the head body, causing the head body to either float or assume a floating posture in which the head body contacts the recording medium.

2. A structure for supporting a magnetic head device, comprising:

a load beam for supporting a head body at one end thereof, said load beam having a highly rigid portion extending a predetermined distance from one end of said load beam where the head body is supported, a fixing portion at the stem end of said load beam for fixing said load beam, and a resiliently deformable portion formed between said rigid portion and said fixing portion and having a plurality of holes formed and arranged therein, said plurality of holes have about the same opening areas and are disposed at equal intervals in a direction parallel to a diagonal drawn across said resiliently deformable portion, such that when said resiliently deformable portion is viewed cross sectionally in a widthwise direction thereof, a region of a portion without said holes has a larger cross sectional area sum and a region of the portion with said holes has a smaller cross sectional area sum such that the cross sectional area sum ratio between the larger cross sectional area sum and smaller cross sectional area sum is not more than two to one, wherein when the recording medium starts moving, air currents produce a floating force which is exerted to the head body, causing the head body to either float or assume a floating posture in which the head body contacts the recording medium.

3. A structure for supporting a magnetic head device according to claim 2, wherein said holes are formed in said resiliently deformable portion by etching.

* * * * *